Patented Nov. 4, 1924.

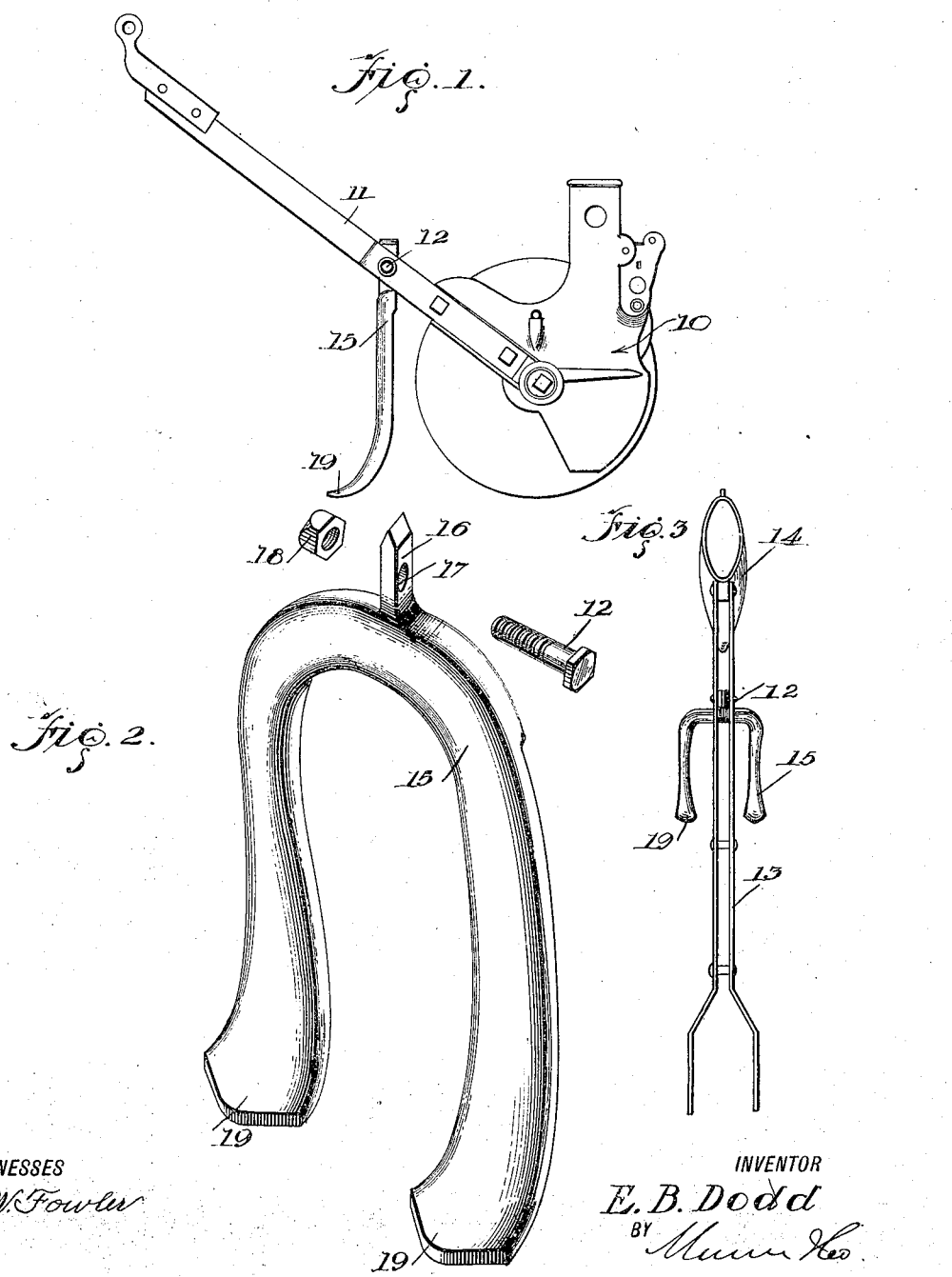

1,513,749

UNITED STATES PATENT OFFICE.

EARL B. DODD, OF PORTLAND, OREGON.

WEEDER ATTACHMENT FOR SEEDERS.

Application filed March 17, 1923. Serial No. 625,843.

*To all whom it may concern:*

Be it known that I, EARL B. DODD, a citizen of the United States, and a resident of Portland, in the county of Multnomah and State of Oregon, have invented certain new and useful Improvements in Weeder Attachments for Seeders, of which the following is a specification.

My present invention relates generally to attachments for seeders or drills of either the single or gang type capable of utilization alike with disc seeders, hoe seeders and seeders of other characters, with the object in view of weed destruction at the same time the seed is planted.

The object of my invention is the provision of a simple inexpensive device which may be readily and quickly attached to the draw bar of a seeder of any particular type, having soil entering and weed destroying members adapted to operate in the ground at opposite sides of the plane of the seeder.

In the accompanying drawing which illustrates my present invention and forms a part of this specification, Figure 1 is a side view showing a disc type seeder with its draw bar, in connection with which my improved attachment is mounted, Figure 2 is a detail perspective view of my improved weed destroying attachment, and Figure 3 is a top plan view showing the hoe type seeder and its draw bar in connection with which my improvements are mounted.

Referring now to these figures and particularly to Figures 1 and 3, I have shown in Figure 1 a disc type seeder 10 having a draw bar 11, transversely apertured intermediate its ends and thus forwardly of the seeder 10, to receive a transverse bolt 12, the two-piece draw bar 13 of Figure 3 being similarly apertured intermediate its ends to receive the bolt 12 so that the latter is thus positioned forwardly of the drill boot 14 shown in this figure and constituting part of a hoe type seeder.

My improved attachment, adapted to be connected to the draw bar of the seeder by virtue of the bolt 12, is generally of inverted U-shape as seen at 15 in Figure 2, having at its upper central portion an upstanding lug 16 provided with an aperture 17 through which the bolt 12 may be extended so that upon application of a nut 18 to the bolt, the attachment is pivotally united to the draw bar and will in use be maintained in the vertical effective position shown in Figure 1 on account of its engagement with the draw bar in the normal upwardly and forwardly inclined position of the latter.

The inverted U-shaped weeding attachment provided by my invention has its depending tines so spaced apart as to enter the ground at opposite sides of the plane of the seeder as will be plainly seen in Figure 3, and as shown most clearly in Figure 2 these tines gradually widen toward their lower soil entering ends and the latter are also curved in parallel planes substantially at right angles to the vertical plane of the body 15 as plainly seen at 19 in Figures 1 and 2 so that when mounted the lower soil entering ends 19 will extend forwardly and act to destroy weeds along opposite sides of the line upon which seed is deposited by the drill.

My improved attachment is both inexpensive and has great strength and durability, and in addition to its operating advantages, may be readily and easily mounted and adds but little to the ordinary drag of the drill.

I claim:

In combination with a seeder having a draw bar, a weeder attachment therefor having pivotal connection with said draw bar forwardly of the seeder, provided with a pair of depending tines having lower widened and forwardly curved soil entering ends and having a portion engageable with the draw bar to normally hold the attachment upright in use.

EARL B. DODD.